US011022669B2

(12) United States Patent
Li et al.

(10) Patent No.: US 11,022,669 B2
(45) Date of Patent: *Jun. 1, 2021

(54) BEACON ARRAY

(71) Applicant: INTERNATIONAL BUSINESS MACHINES CORPORATION, Armonk, NY (US)

(72) Inventors: YuBo Li, Beijing (CN); Yonghua Lin, Beijing (CN); Qing Wang, Beijing (CN); Wei Dong Wang, Shanghai (CN); Chao Xue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,456

(22) Filed: Jul. 8, 2019

(65) Prior Publication Data
US 2019/0331753 A1 Oct. 31, 2019

Related U.S. Application Data

(63) Continuation of application No. 15/661,642, filed on Jul. 27, 2017, now Pat. No. 10,386,445, which is a
(Continued)

(51) Int. Cl.
*G01S 1/00* (2006.01)
*G01S 1/02* (2010.01)
*G01S 11/06* (2006.01)

(52) U.S. Cl.
CPC .............. *G01S 1/00* (2013.01); *G01S 1/024* (2013.01); *G01S 11/06* (2013.01)

(58) Field of Classification Search
CPC ... G01S 1/00; G01S 1/02; G01S 1/022; G01S 1/024; G01S 1/026; G01S 1/045; G01S 1/46; G01S 1/54; G01S 1/82; G01S 1/763; G01S 3/023; G01S 3/7803; G01S 5/021; G01S 7/40; G01S 7/497; G01S 7/52004;
(Continued)

(56) References Cited

U.S. PATENT DOCUMENTS 6,600,445 B2  7/2003  Li
6,829,550 B2  12/2004 Kim
(Continued)

OTHER PUBLICATIONS

C. Javali et al., "Seak: secure authentication and Key Generation Protocol based on Dual Antennas for Wireless Body Area Networks", School of Computer Science and Engineering, UNSW, Australia NICTA, Australia 2014, pp. 1-15.
(Continued)

*Primary Examiner* — Tri H Phan
(74) *Attorney, Agent, or Firm* — Cantor Colburn LLP; Joseph Petrokaitis

(57) ABSTRACT

A method comprises receiving a first received signal strength indicator (RSSI) of a first beacon in an array of beacons and receiving a second RSSI of a second beacon in an array of beacons, calculating a RSSI of the array (r) as a function of the first RSSI and the second RSSI, retrieving a calibrated RSSI value of the array (r') from a memory, determining whether r>r', and outputting a signal to a user device responsive to determining that r>r'.

20 Claims, 3 Drawing Sheets

Related U.S. Application Data continuation of application No. 14/748,463, filed on Jun. 24, 2015, now Pat. No. 9,759,799.

(58) Field of Classification Search
CPC ........ G01S 7/5205; G01S 11/06; G01S 19/23; G01S 19/235; Y02B 60/50; H04W 24/08; H04W 72/08; H04W 72/085
See application file for complete search history.

(56) References Cited

U.S. PATENT DOCUMENTS

| | | | |
|---|---|---|---|
| 7,212,828 B2 | 5/2007 | Hind et al. | |
| 7,454,189 B2 | 11/2008 | Kim | |
| 7,904,116 B2 * | 3/2011 | Tanaka | H04B 17/21 455/561 |
| 7,974,598 B2 | 7/2011 | Kong et al. | |
| 8,014,743 B1 | 9/2011 | Kong et al. | |
| 8,026,814 B1 | 9/2011 | Heinze et al. | |
| 8,688,140 B2 | 4/2014 | Nemeth | |
| 8,786,440 B2 | 7/2014 | Clare et al. | |
| 9,179,343 B2 | 11/2015 | Yang et al. | |
| 9,473,947 B2 | 10/2016 | Ho et al. | |
| 9,746,541 B2 * | 8/2017 | Li | G01S 11/06 |
| 9,759,799 B2 * | 9/2017 | Li | G01S 11/06 |
| 9,894,580 B1 | 2/2018 | Chen et al. | |
| 10,386,445 B2 * | 8/2019 | Li | G01S 11/06 |
| 10,386,446 B2 * | 8/2019 | Li | G01S 11/06 |
| 10,455,608 B2 * | 10/2019 | Shepard | H04B 7/0452 |
| 10,849,134 B2 * | 11/2020 | Islam | H04W 72/048 |
| 2004/0064281 A1 | 4/2004 | Kim | |
| 2004/0203908 A1 | 10/2004 | Hind et al. | |
| 2004/0203910 A1 | 10/2004 | Hind et al. | |
| 2005/0239506 A1 | 10/2005 | Li | |
| 2005/0285803 A1 | 12/2005 | Iacono et al. | |
| 2006/0044185 A1 | 3/2006 | Jin et al. | |
| 2007/0290924 A1 | 12/2007 | McCoy | |
| 2010/0159958 A1 | 6/2010 | Naguib et al. | |
| 2011/0002295 A1 | 1/2011 | Ghosal et al. | |
| 2011/0050487 A1 | 3/2011 | Melconian et al. | |
| 2011/0080267 A1 | 4/2011 | Clare et al. | |
| 2011/0128124 A1 | 6/2011 | Im | |
| 2012/0169541 A1 | 7/2012 | Singh | |
| 2013/0084886 A1 | 4/2013 | Crilly, Jr. et al. | |
| 2014/0214427 A1 | 7/2014 | Chao et al. | |
| 2014/0357196 A1 | 12/2014 | Mayor et al. | |
| 2014/0370917 A1 | 12/2014 | Buchheim et al. | |
| 2015/0105099 A1 | 4/2015 | Luo et al. | |
| 2015/0294084 A1 | 10/2015 | McCauley et al. | |
| 2016/0227370 A1 | 8/2016 | Gunnarsson et al. | |
| 2016/0286407 A1 | 9/2016 | Simonsson et al. | |
| 2016/0341811 A1 | 11/2016 | Langlois | |
| 2017/0322284 A1 | 11/2017 | Li et al. | |
| 2017/0322285 A1 | 11/2017 | Li et al. | |
| 2018/0067187 A1 | 3/2018 | Oh et al. | |

OTHER PUBLICATIONS

List of IBM Patents or Patent Applications Treated as Related; (Appendix P), Filed Jul. 8, 2019, 2 pages.

* cited by examiner

BEACON ARRAY

DOMESTIC PRIORITY

This application is a continuation of U.S. Non-Provisional application Ser. No. 15/661,642, filed Jul. 27, 2017, which is a continuation of U.S. Non-Provisional application Ser. No. 14/748,463, filed Jun. 24, 2015, now issued as U.S. Pat. No. 9,759,799, the contents of which are incorporated herein by reference in their entirety.

BACKGROUND

The present invention relates to mobile device positioning.

Low energy transmitting beacons are devices that emit low energy signals that may be received by mobile devices. The beacons emit a signal that includes data that uniquely identifies the beacon.

When a mobile device is proximate to the beacon, the mobile device receives the signal, which often initiates a software routine. For example, if a user device receives a signal from a beacon, the user device may send the unique identifier of the beacon to a server that processes the unique identifier and sends data associated with the unique identifier to the user device. Since the signal is a low energy signal, the user device will only receive the signal when the user device is proximate to the beacon, thus if the beacon location is known, the location of the user device may assumed to be within a short distance from the beacon. Some user devices may measure the strength of the signal which allows the user device to estimate the distance between the user device and the beacon.

Such a system is often used in retail settings where a user device may receive a signal from a beacon located in a retail store. The user device may send the unique identifier of the beacon to a server, the server then sends information to the user such as, for example, information about a sales promotion at the retail store. Thus, targeted advertising may be sent to a user device based on the location of the user device.

A beacon scheme may also be used to instigate other features of a mobile device, such as, for example, mobile electronic payment or banking applications.

SUMMARY

According to one embodiment of the present invention, a method comprises receiving a first received signal strength indicator (RSSI) of a first beacon in an array of beacons and receiving a second RSSI of a second beacon in an array of beacons, calculating a RSSI of the array (r) as a function of the first RSSI and the second RSSI, retrieving a calibrated RSSI value of the array (r') from a memory, determining whether r>r', and outputting a signal to a user device responsive to determining that r>r'.

According to another embodiment of the present invention, a computer program product comprising a computer readable storage medium having program instructions embodied therewith, the program instructions executable by a processor to cause the processor to perform a method that comprises receiving a first received signal strength indicator (RSSI) of a first beacon in an array of beacons and receiving a second RSSI of a second beacon in an array of beacons, calculating a RSSI of the array (r) as a function of the first RSSI and the second RSSI, retrieving a calibrated RSSI value of the array (r') from a memory, determining whether r>r', and outputting a signal to a user device responsive to determining that r>r'.

According to yet another embodiment of the present invention, a system comprises a memory, and a processor operative to receive a first received signal strength indicator (RSSI) of a first beacon in an array of beacons and receiving a second RSSI of a second beacon in an array of beacons, calculate a RSSI of the array (r) as a function of the first RSSI and the second RSSI, retrieve a calibrated RSSI value of the array (r') from a memory, determine whether r>r', and output a signal to a user device responsive to determining that r>r'.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
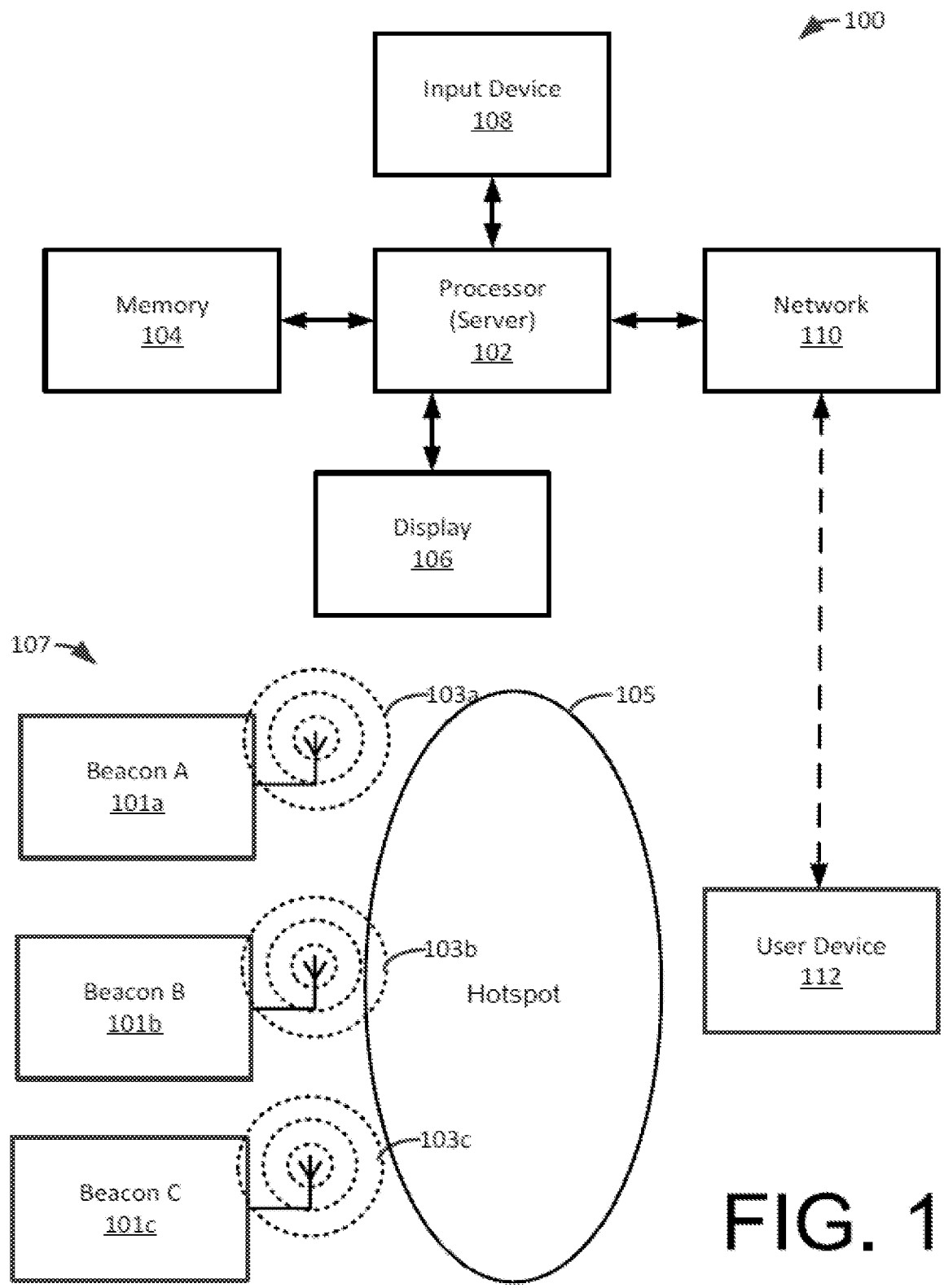
FIG. 1 is a schematic diagram illustrating an exemplary beacon system suitable for use with embodiments of the invention.

Low energy beacons (beacons) emit a low energy signal that typically includes a unique identifier of the beacon. When a mobile device such as, for example, a smart phone is proximate to the beacon, the mobile device processes the signal and receives the unique identifier of the beacon. The unique identifier of the beacon may be used to initiate a variety of applications and functions on the mobile device.

The beacon signal also includes data that indicates the set transmission power (txPower) of the signal output by the beacon. The set transmission power indicates how strong the signal from the beacon should be at a known distance. The user device may determine the distance from the user device to the beacon by receiving the beacon signal that includes the txPower of the beacon and comparing the txPower of the beacon to the strength of the signal received by the user device. In this regard, the user device calculates a received signal strength indication (RSSI) that indicates the strength of the beacon signal received by the user device. Since the signal sent by the beacon includes data that indicates the transmission power of the signal at a known distance, the user device can compare the transmission power to the RSSI to calculate an actual distance between the user device and the beacon.

When a beacon is installed by a technician, the beacon is calibrated to determine the signal strength of the beacon at a particular distance from the beacon. For example, when a beacon is installed in a fixed position and activated so that the beacon is emitting a signal, a technician uses a device to receive the signal at a known set distance from the beacon and calculate the RSSI of the signal.

The calculated distance however, often has a high degree of uncertainty due to a variety of environmental factors such as the location of obstructions near the beacon or the user device and ambient signal noise. Uncertainties in the calculated distance can cause a number of problems in an environment that has many beacons. For example, in a retail environment, a user device may receive a signal from a first beacon that is associated with sending a message about a new product, while receiving a signal from a second beacon that is associated with paying for products at a checkout counter. If the user device cannot determine the distance between the user device and the beacons with sufficient certainty, the user device may undesirably initiate a routine that presents the user with information about the new product instead of initiating the routine that allows the user to purchase a product at the checkout counter.

To reliably implement a beacon scheme, the beacon is calibrated when it is installed. Typically, the calibration includes activating the beacon, and testing the RSSI at a standard distance from the beacon. The RSSI measured at the standard distance is used to calibrate the beacon. Once the beacon is calibrated, the signal output by the beacon will indicate what the RSSI should be at the standard distance. The user device receives this information from the beacon signal calculates the RSSI and determines whether the RSSI is larger or smaller than the RSSI at the standard distance. If the RSSI is smaller, the user device should be farther than the standard distance, while if the RSSI is greater, the user device should be less than the standard distance.

The methods and systems described below improve the certainty of calculating the position of a user device in an environment that uses beacons.

FIG. 1 illustrates a beacon system 100. The system 100 includes a processor 102 that may include, for example, a server that is communicatively connected to a memory 104, a display 106, an input device 108, and a network 110. The user device 112 may include any device that may receive and process a signal from a transmitter. The user device 112 is communicatively connected to the processor 102 via the network 110. The system 100 includes a beacon array 107 that includes beacons A-C 101a, 101b, and 101c. The beacon array 107 of the illustrated embodiment includes three beacons 101; alternate embodiments of system 100 may include a beacon array 107 with any number of beacons. Each beacon 101a-c emits a respective signal 103a-b. The signals 103 are similar signals in that the signals 103 each include a unique identifier of the beacon array 107. The system 100 includes a hotspot 105. When the user device is in the hotspot 105, the user device 112 is at a desired distance from the array 107 to initiate a particular function on the user device that is associated with the hotspot 105.

In general operation, the system is calibrated (offline) prior to operation by a user. In the calibration, the offline RSSI of the of each beacon is received. According to the offline RSSI, the coherent time of each beacon is extracted. A partition threshold is chosen, which meets the criterion that minimizes the sum of standard deviation of each partition. The maximal distance between two thresholds is chosen as the coherent time.

The coherent time is defined as the coherent window, in the coherent window, the variance of RSSI is calculated to decide whether the beacon is trustable. High variance means that the beacon is less trustable. The measurement may be used as a weighting factor.

The calculation window is chosen according to the real time requirements of users. In the calculation window, the average value of RSSI of each beacon is calculated, and multiplied by the weighting factor to calculate the weighting sum of the beacon array as the online measurement. The measurement offline is similarly calculated however, the average value and variance value are calculated during calibration time and not during the coherent window and the calculation window.

The criterion is established that when the measurement online is greater than measurement offline, the user has entered the hotspot, when the measurement online is less than measurement offline, the user has left the hotspot.

Figure 2:
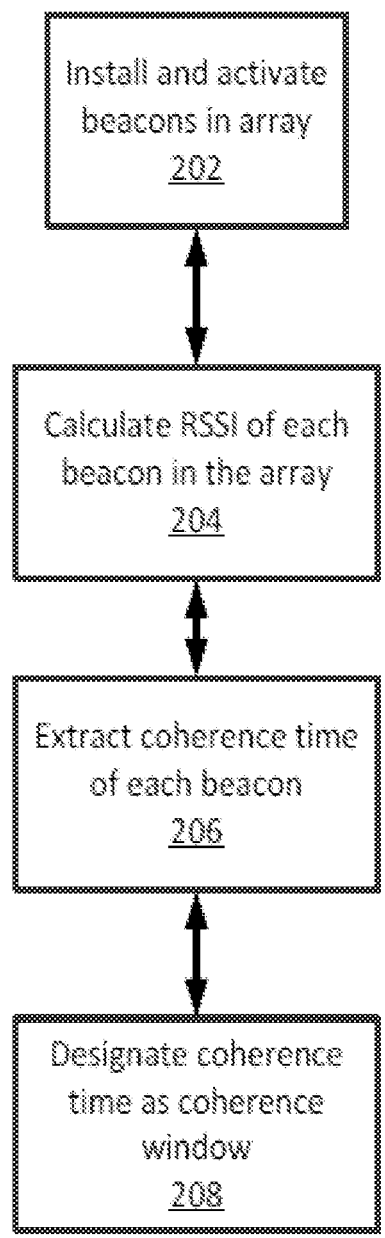
FIG. 2 illustrates a block diagram of an exemplary method for installing and calibrating the beacon array of FIG. 1.

FIG. 2 illustrates a block diagram of an exemplary method for installing and calibrating the array 107 (of FIG. 1). In operation, the array 107 is installed by a technician and calibrated. The calibration is performed by fixing the physical location of each beacon 101 in the array 107 and activating each beacon 101 in block 202. In block 202, the technician uses a device that detects the RSSI of each beacon 101 in the array 107 at a boundary of the hotspot 105. In block 206 the coherence time of each beacon is calculated.

The coherence time may be modeled as a partition of a sequence (x1, x2, . . . xn). The criterion is to minimize the sum of the standard deviation of each partition. For example, T=Partition(X,Q,F), where X is the input sequence, Q is the utility function of the partition, F is the boundary condition, and T is the output in a sequence of thresholds. If F is satisfied, Ø is returned. To maximize Q, X is partitioned into Xl and Xr with a threshold T. Tl=Partition(Xl, Q, F) and Tr=Partition(Xr, Q, F), which returns TlU {t}U Tr·Q=std (x)−sum{(xi/x)*std(xi)}. The maximal distance between the two thresholds is chosen as the coherence time.

The array RSSI calibration value is calculated using the formula:

$$r' = \Sigma_i \frac{1 - \Sigma_j^{j \neq i} s'_j}{\Sigma_k s'_k} \times b'_i,$$

where r' is the RSSI calibration value, $b_i'$ is the average RSSI at calibration time and $s_i'$ is the variance of the RSSI at calibration time.

The array RSSI calibration value r' may be stored, for example, in memory of the user device or in the memory 104 of the server 102. Once the system is calibrated, the system is ready for operation.

Figure 3:
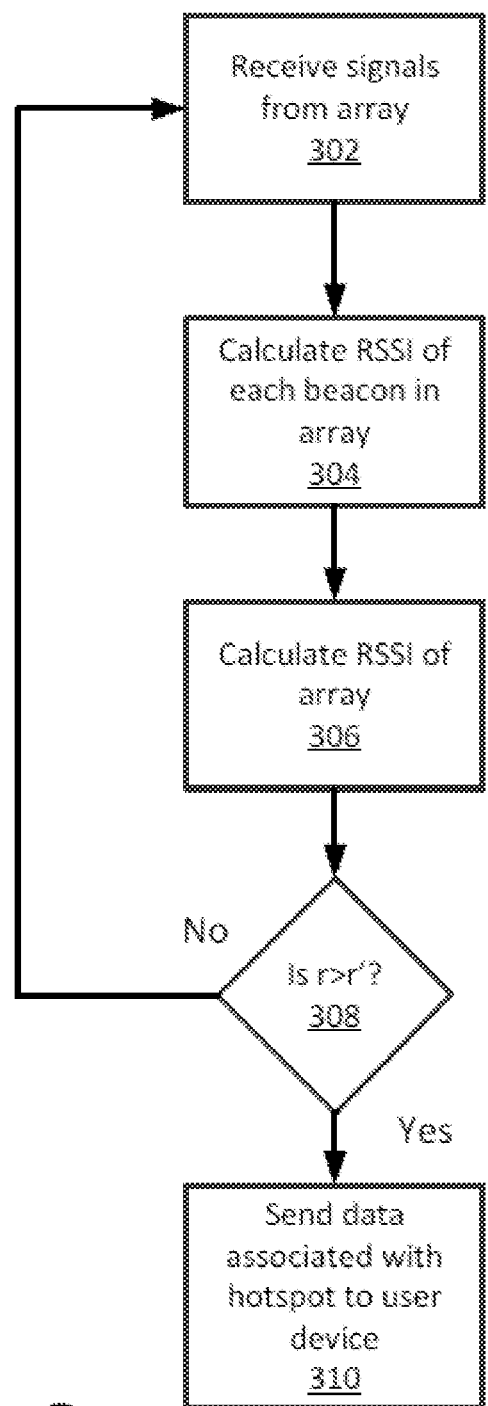
FIG. 3 illustrates a block diagram of an exemplary method of operation of the beacon system.

FIG. 3 illustrates a block diagram of an exemplary method of operation of the system 100. In operation, when the user device receives a signal from the array 107 (of FIG. 1) in block 304, the user device 112 calculates the RSSI of the signals 103 from the beacons 101 of the array 107. The RSSI of the array 107 is calculated in block 306 using the following formula:

$$r = \Sigma_i \frac{1 - \Sigma_j^{j \neq i} s_j}{\Sigma_k s_k} \times b_i,$$

where $b_i$ is the average RSSI in the calculate window, $S_i$ is the variance of the RSSI in the coherence time window, r is the RSSI estimation of the array, s is the varience of the RSSI in the coherence time window and j and k represent an index of the beacon array.

The RSSI of the array 107 may be calculated by, for example the user device 112, or may be calculated by the server 102. In the illustrated embodiment, the server 102 receives the unique identifier of the array and the RSSI of each beacon, and calculates the RSSI of the array 107.

In block 308 if the r value is greater than r' the user device 112 is in the hotspot 105, and data associated with the hotspot, or an instruction associated with the hotspot is sent from the server 102 to the user device 112. Once the user device 112 is determined to be in the hotspot 105, the user device 112 may for example display information associated with the hotspot 105 to the user on a display of the user device 112.

Often beacons 101 may be operated using battery power. The beacons 101 have a broadcasting interval that may be changed to optimize battery consumption. When the broadcast interval is short, the battery consumption is higher; the battery consumption decreases when the broadcast interval is increased. Because the positions of each beacon 101 in the array are different, the signals of each beacon 101 in the array have different propagation paths. Adjusting the broadcasting interval and the transmitting power of each beacon 101 individually in the array 107 can reduce the battery consumption rate of the beacons 101 in the array 107 while optimizing the performance of the array 107. The broadcasting interval of each beacon 101 in the array 107 may be adjusted dynamically by adjusting a broadcasting interval setting in the firmware. The battery consumption may be monitored by, for example, inserting battery information into the Scan Response Frame of the communications protocol used by the beacons 101.

The txPower of each beacon 101 may be adjusted individually to optimize the overall txPower of the array 107. Adjusting the txPower of individual beacons 101 in the array may improve the performance of the array 107 and reduce power consumption of the array 107 since the position of each individual beacon 101 in the array is different, and thus, the signal propagation path of each individual beacon 101 is different due to the environment, which may cause, for example, reflection of the signals from particular beacons 101.

The methods and systems described above reduce the uncertainty of locating mobile devices in an environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a first received signal strength indicator (RSSI) of a first beacon in an array of beacons and receiving a second RSSI of a second beacon in an array of beacons;
calculating a coherence time for the first beacon and the second beacon, wherein the coherence time in a window of the first beacon and second beacon in the beacon array is modeled as a partition of a sequence (x1, x2, . . . xn) and a criterion of the sequence minimizes a sum of the standard deviation of each partition, where T=Partition(X,Q,F), X is an input sequence, Q is a utility function of the partition, F is a boundary condition, and T is the output in a sequence of thresholds, wherein if F is satisfied, Ø is returned, maximizing Q, X is partitioned into Xl and Xr with a threshold T, Tl=Partition(Xl, Q, F) and Tr=Partition(Xr, Q, F), which returns Tl U {t} U Tr, Q=std(x)−sum{(xi/x)*std(xi)}, and a maximal distance between the threshold Tl and Tr is the coherence time;
calculating a RSSI of the array (r) as a function of the first RSSI and the second RSSI based at least in part on the coherence time for the first beacon and the second beacon;
retrieving a calibrated RSSI value of the array (r') from a memory;
determining whether r>r'; and
outputting a signal to a user device responsive to determining that r>r', the signal comprising data to instigate a feature of the user device.

2. The method of claim 1, wherein the signal output to the user device is associated with the array of beacons.

3. The method of claim 1, wherein the array of beacons partially defines a hotspot such that when r>r' the user device is located in the hotspot.

4. The method of claim 1, wherein the feature includes a mobile electronic payment feature.

5. The method of claim 1, wherein the feature includes a banking application feature.

6. The method of claim 1, wherein the first beacon is operative to output a signal having a transmission interval and the transmission interval is adjustable.

7. The method of claim 1, wherein the calibrated RSSI value of the array is defined by $$r' = \Sigma_i \frac{1 - \Sigma_j^{j \neq i} s'_j}{\Sigma_k s'_k} \times b'_i,$$

where r' is the RSSI calibration value, $b_i'$ is the average RSSI at calibration time and is the variance of the RSSI at calibration time.

8. A computer program product comprising a non-transitory computer readable storage medium having program instructions embodied therewith, the program instructions executable by a processor to cause the processor to perform steps comprising:

receiving a first received signal strength indicator (RSSI) of a first beacon in an array of beacons and receiving a second RSSI of a second beacon in an array of beacons;

calculating a coherence time for the first beacon and the second beacon, wherein the coherence time in a window of the first beacon and second beacon in the beacon array is modeled as a partition of a sequence (x1, x2, . . . xn) and a criterion of the sequence minimizes a sum of the standard deviation of each partition, where T=Partition(X,Q,F), X is an input sequence, Q is a utility function of the partition, F is a boundary condition, and T is the output in a sequence of thresholds, wherein if F is satisfied, Ø is returned, maximizing Q, X is partitioned into Xl and Xr with a threshold T, Tl=Partition(Xl, Q, F) and Tr=Partition(Xr, Q, F), which returns Tl U {t} U Tr, Q=std(x)−sum{(xi/x)*std(xi)}, and a maximal distance between the threshold Tl and Tr is the coherence time;

calculating a RSSI of the array (r) as a function of the first RSSI and the second RSSI based at least in part on the coherence time for the first beacon and the second beacon;

retrieving a calibrated RSSI value of the array (r') from a memory;

determining whether r>r'; and outputting a signal to a user device responsive to determining that r>r', the signal comprising data to instigate a feature of the user device.

9. The computer program product of claim 8, wherein the signal output to the user device is associated with the array of beacons.

10. The computer program product of claim 8, wherein the array of beacons partially defines a hotspot such that when r>r' the user device is located in the hotspot.

11. The computer program product of claim 8, wherein the feature includes a mobile electronic payment feature.

12. The computer program product of claim 8, wherein:
the feature includes display of information associated with the data on a display of the user device; and
the information associated with the data includes information about a sales promotion.

13. The computer program product of claim 8, wherein the method further comprises receiving a unique identifier of the array of beacons.

14. The computer program product of claim 8, wherein the calibrated RSSI value of the array is defined by $$r' = \Sigma_i \frac{1 - \Sigma_j^{j \neq i} s'_j}{\Sigma_k s'_k} \times b'_i,$$

where r' is the RSSI calibration value, $b_i'$ is the average RSSI at calibration time and is the variance of the RSSI at calibration time.

15. A system comprising:
a memory; and
a processor operative to:
receive a first received signal strength indicator (RSSI) of a first beacon in an array of beacons and receiving a second RSSI of a second beacon in an array of beacons;

calculate a coherence time for the first beacon and the second beacon, wherein the coherence time in a window of the first beacon and second beacon in the beacon array is modeled as a partition of a sequence (x1, x2, . . . xn) and a criterion of the sequence minimizes a sum of the standard deviation of each partition, where T=Partition(X,Q,F), X is an input sequence, Q is a utility function of the partition, F is a boundary condition, and T is the output in a sequence of thresholds, wherein if F is satisfied, Ø is returned, maximizing Q, X is partitioned into Xl and Xr with a threshold T, Tl=Partition(Xl, Q, F) and Tr=Partition(Xr, Q, F), which returns Tl U {t} U Tr, Q=std(x)−sum{(xi/x)*std(xi)}, and a maximal distance between the threshold Tl and Tr is the coherence time;

calculate a RSSI of the array (r) as a function of the first RSSI and the second RSSI based at least in part on the coherence time for the first beacon and the second beacon;

retrieve a calibrated RSSI value of the array (r') from a memory;

determine whether r>r'; and output a signal to a user device responsive to determining that r>r', the signal comprising data to instigate a feature of the user device.

16. The system of claim 14, wherein the signal output to the user device is associated with the array of beacons.

17. The system of claim 14, wherein the array of beacons partially defines a hotspot such that when r>r' the user device is located in the hotspot.

18. The system of claim 14, wherein the feature includes a mobile electronic payment feature.

19. The system of claim 14, wherein the processor is further operative to receive a unique identifier of the array of beacons.

20. The system of claim 14, wherein the calibrated RSSI value of the array is defined by $$r' = \Sigma_i \frac{1 - \Sigma_j^{j \neq i} s'_j}{\Sigma_k s'_k} \times b'_i,$$

where r' is the RSSI calibration value, $b_i'$ is the average RSSI at calibration time and is the variance of the RSSI at calibration time.

* * * * *